(12) United States Patent
Chubachi

(10) Patent No.: US 6,237,709 B1
(45) Date of Patent: *May 29, 2001

(54) HYBRID VEHICLE

(75) Inventor: Katsuyoshi Chubachi, Saitama (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/731,070

(22) Filed: Oct. 9, 1996

(30) Foreign Application Priority Data

Nov. 14, 1995 (JP) .................................................. 7-295765

(51) Int. Cl.⁷ ...................................................... B60K 6/04

(52) U.S. Cl. ........................................ 180/65.2; 180/65.3

(58) Field of Search ................................. 180/65.2, 65.3, 180/65.4, 65.8; 123/329, 333, 198 A

(56) References Cited

U.S. PATENT DOCUMENTS

| | | | |
|---|---|---|---|
| 4,335,429 | * 6/1982 | Kawakatsu | 180/65.2 |
| 5,172,006 | * 12/1992 | Suzuki et al. | 180/65.2 |
| 5,224,565 | * 7/1993 | Tamura et al. | 123/333 |
| 5,335,744 | * 8/1994 | Takasuka et al. | 123/333 |
| 5,343,970 | * 9/1994 | Severinsky | 180/65.2 |
| 5,359,308 | * 10/1994 | Sun et al. | 180/65.3 |
| 5,559,703 | * 9/1996 | Iwata et al. | 123/333 |
| 5,664,635 | * 9/1997 | Koga et al. | 180/65.3 |
| 5,697,466 | * 12/1997 | Moroto et al. | 180/65.8 |
| 5,771,478 | * 6/1998 | Tsukamoto et al. | 180/65.2 |
| 5,842,534 | * 12/1998 | Frank | 180/65.2 |

* cited by examiner

Primary Examiner—Frank Vanaman
(74) Attorney, Agent, or Firm—Lyon & Lyon LLP

(57) ABSTRACT

In a hybrid vehicle including a gasoline engine and an electric motor capable of applying an assist force to the gasoline engine, the electric motor is controlled so as to increase the assist force applied to the gasoline engine when a knocking is detected by a knock sensor mounted on the gasoline engine. Thus, even when a gasoline of a low octane value is used, the drivability of the vehicle can be prevented from being degraded.

18 Claims, 5 Drawing Sheets

HYBRID VEHICLE

BACKGROUND OF THE INVENTION

1. Field of the Invention

The present invention relates to a hybrid vehicle including a gasoline engine and an electric motor capable of applying an assist force to the gasoline engine.

2. Description of the Related Art

In the control of the gasoline engine, it is conventionally known that when a knocking is generated due to a low octane value of a gasoline, the ignition timing of the gasoline engine is retarded to protect the engine and thereafter, the ignition timing is gradually advanced.

However, if the ignition timing is retarded when the octane value of the gasoline is low, from the viewpoint that the engine is preferentially protected, the output torque from the engine is reduced due to the retarding of the ignition timing and an intrinsic engine output is not obtained when the gasoline is of a low octane value, as compared with the case where the gasoline is of a preset octane value is used, as shown in FIG. 5. Particularly, when a driver unconsciously uses a gasoline of an octane value lower than the preset octane value, the following problem is encountered: the ignition timing remains retarded and the degradation in drivability is generated without the driver being conscious thereof.

SUMMARY OF THE INVENTION

Accordingly, it is an object of the present invention to provide a hybrid vehicle wherein the drivability can be prevented from being degraded even when a gasoline of a low octane value is used.

To achieve the above object, according to the present invention, there is provided a hybrid vehicle comprising: a gasoline engine; an electric motor capable of applying an assist force to the gasoline engine; a knock sensor mounted on the gasoline engine; and an electric motor control means for controlling the electric motor so as to increase the assist force applied to the gasoline engine in response to detection of a knocking by the knock sensor.

With such arrangement, even if a driver unconsciously uses a gasoline of an octane value lower than the preset octane value, the assist force applied to the gasoline engine by the electric motor is increased in response to the detection of a knocking, and the drivability will not be degraded that the driver will be conscious of.

According to another aspect and feature of the present invention, the ignition timing of the gasoline engine by an ignitor is retarded in response to the detection of a knocking by the knock sensor. Thus, when the knocking is generated, the ignition timing can be retarded to protect the gasoline engine.

With the above arrangement, when the knocking is generated, the ignition timing is retarded to protect the engine.

According to a further aspect and feature of the present invention, the increment of the assist force of the electric motor by the control of the electric motor control means is determined in accordance with a retarded amount of the ignition timing by the control of an ignitor control means. Thus, the travel performance intrinsically possessed by the hybrid vehicle can be maintained at substantially the same level.

With the above arrangement, it is possible to keep the intrinsic traveling property of the hybrid vehicle at a substantially constant level.

The above and other objects, features and advantages of the invention will become apparent from the following description of preferred embodiments taken in conjunction with the accompanying drawings.

DETAILED DESCRIPTION OF THE PREFERRED EMBODIMENTS

Figure 1:
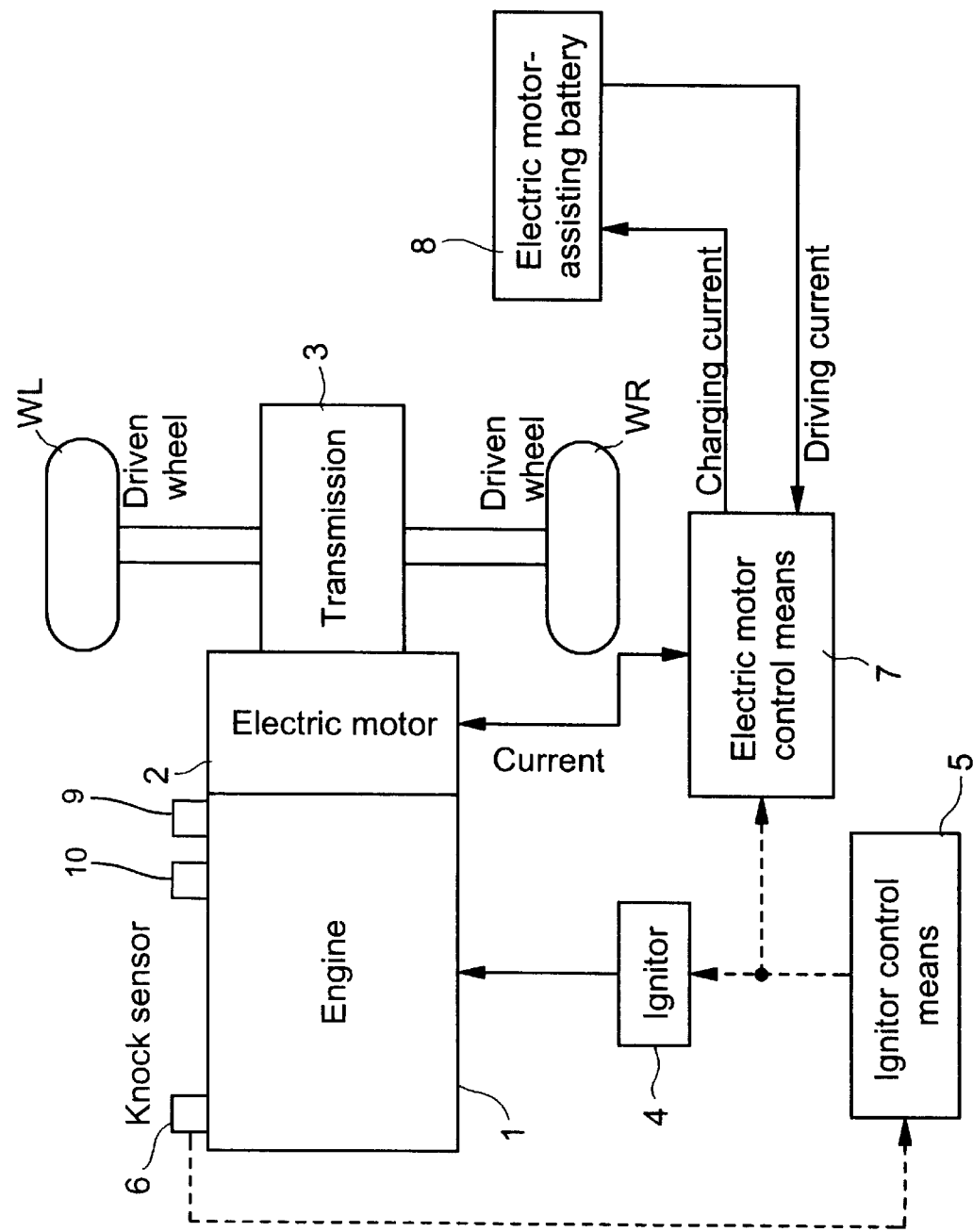
FIG. 1 is a block diagram illustrating an arrangement of a hybrid vehicle according to a first embodiment of the present invention.

A first embodiment of the present invention will now be described with reference to FIGS. 1 to 3. Referring to FIG. 1, a transmission 3 is connected to an output shaft of a gasoline engine 1 mounted in a vehicle through an electric motor 2 used as a generator, so that an output from the transmission 3 is transmitted to left and right driven wheels WL and WR.

An ignitor 4 of the gasoline engine 1 is controlled by an ignitor control means 5, to which a detection signal detected by a knock sensor 6 mounted on the gasoline engine 1 is input.

The electric motor 2 is controlled by an electric motor control means 7. The electric motor control means 7 controls the electric motor 2 so as to apply an assist force to the gasoline engine 1 by supplying electric power from an electric motor-assisting battery 8 to operate the electric motor 2, and controls the electric motor 2 so as to operate the electric motor 2 as a generator to supply a charging current to the electric motor-assisting battery 8, when the assist force is not required, e.g., during engine brake.

A control signal from the ignitor control means 5 is also applied to the electric motor control means 7. A control procedure, which is to be carried out when a knocking generated due to a low octane value of a gasoline supplied to the gasoline engine 1 has been detected by the knock sensor 6, is established as shown in FIG. 2.

Figure 2:
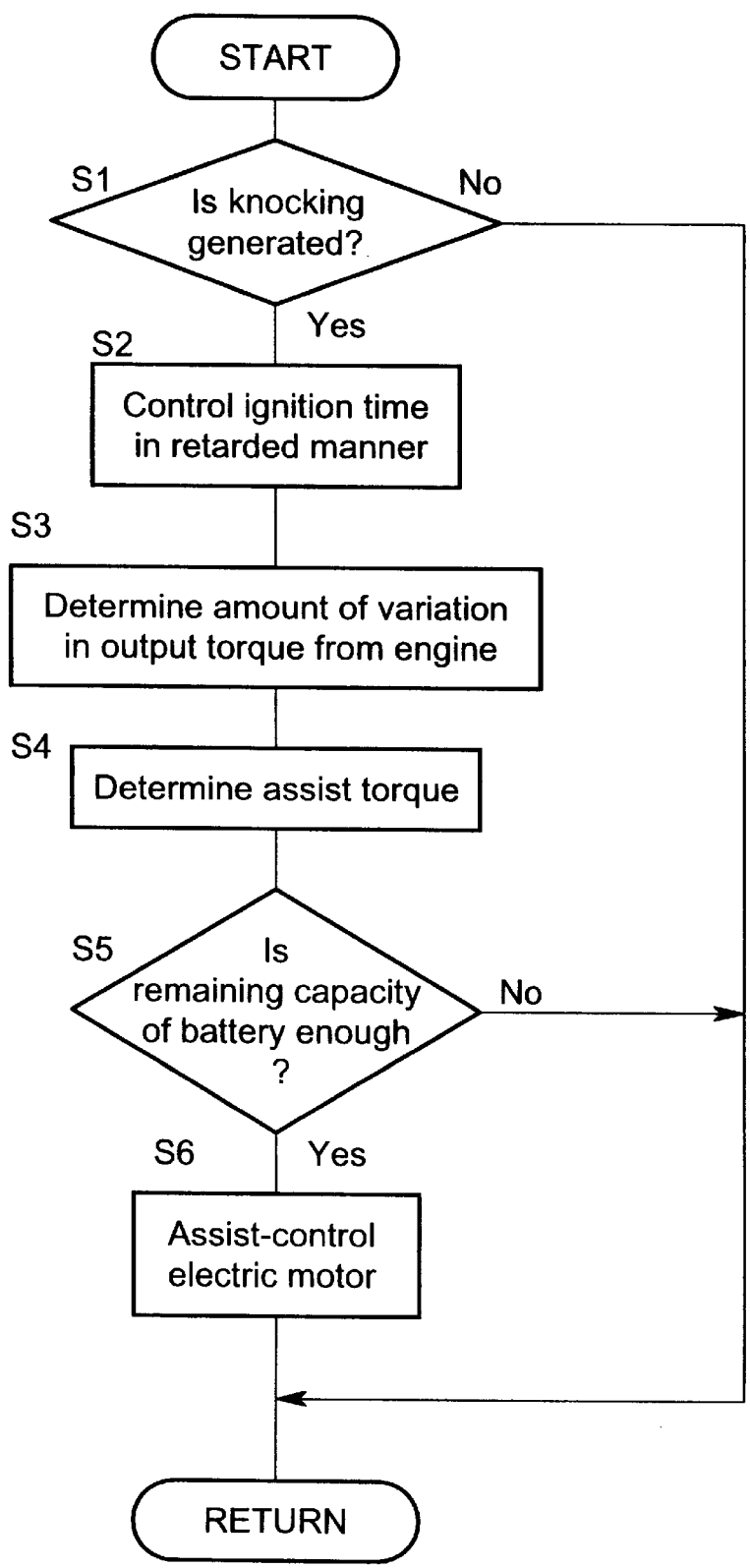
FIG. 2 is a flowchart illustrating a procedure for assist control of an electric motor.
Figure 3:
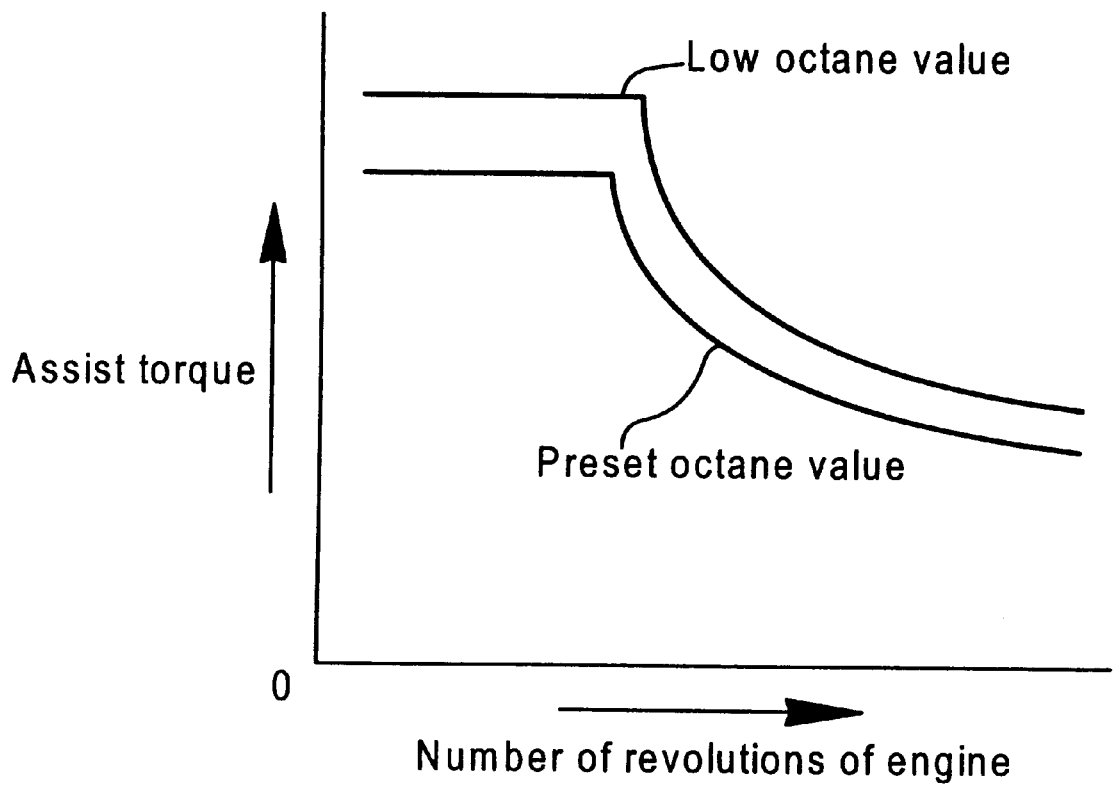
FIG. 3 is a diagram showing the assist forces when gasoline has a preset octane value and when the gasoline has a low octane value.

At step S1 in FIG. 2, it is determined whether any knocking has been detected by the knock sensor 6. If knocking has been detected, the processing is advanced to step S2 at which the timing of igniting by the ignitor 4 is retarded by the ignitor control means 5. Then, at step S3, an amount of variation in an output torque from the gasoline engine 1, as a result of retarding of the ignition timing is searched on a map based on the retarded amount and the number of revolutions of the crankshaft of the engine per unit of time, as detected by a speed of revolution sensor 9 (hereinafter "number of revolutions of the engine"). At step S4, an assist torque corresponding to the varied amount of the output torque from the gasoline engine 1 is searched on a map based on the varied amount of the output torque and the number of revolutions of the engine.

At step S5 after the required assist torque has been determined at step S4, it is determined whether the remaining capacity of the electric motor-assisting battery 8 is enough to drive the electric motor 2. If the remaining capacity is enough, the assist control of the electric motor 2 is carried out at step S6. If the remaining capacity is not enough, the assist control of the electric motor 2 is not carried out.

The operation of this embodiment will now be described. When a knocking is generated due to a low octane value of the gasoline, a control signal from the ignitor control means 5 is supplied to the ignitor 4 of the gasoline engine 1 to retard the ignition timing of the gasoline engine 1 and to the electric motor control means 7 to control the electric motor 2 by the electric motor control means 7 to increase the assist force applied to the gasoline engine 1. Thus, by retarding the ignition timing of the gasoline engine 1, the gasoline engine 1 can be protected, and the decrement of the output from the gasoline engine 1 due variation in to the retarded in ignition timing can be compensated for by an increase in assist force provided by the electric motor 2. More specifically, as shown in FIG. 3, when a gasoline of a low octane value is used, the assist torque applied to the gasoline engine 1 by the electric motor 2 is increased by a retard-varied amount of the ignition timing, as compared with the case where a gasoline of preset octane value is used. Therefore, even when a driver unconsciously uses a gasoline of an octane value lower than the preset octane value, the degradation in drivability will not be generated that the driver will be conscious of, and the travel performance can be prevented from being varied on the assumption that the driving force input to the transmission 3 is substantially at the same level, irrespective of a knocking being generated or not generate If the remaining capacity of the electric motor-assisting battery 8 is not enough, the application of the assist force by the electric motor 2 is not carried out. However, the ignition timing of the gasoline engine 1 is retarded in a variable manner and hence, the protection of the gasoline engine 1 for accommodating the knocking can be performed.

Figure 4:
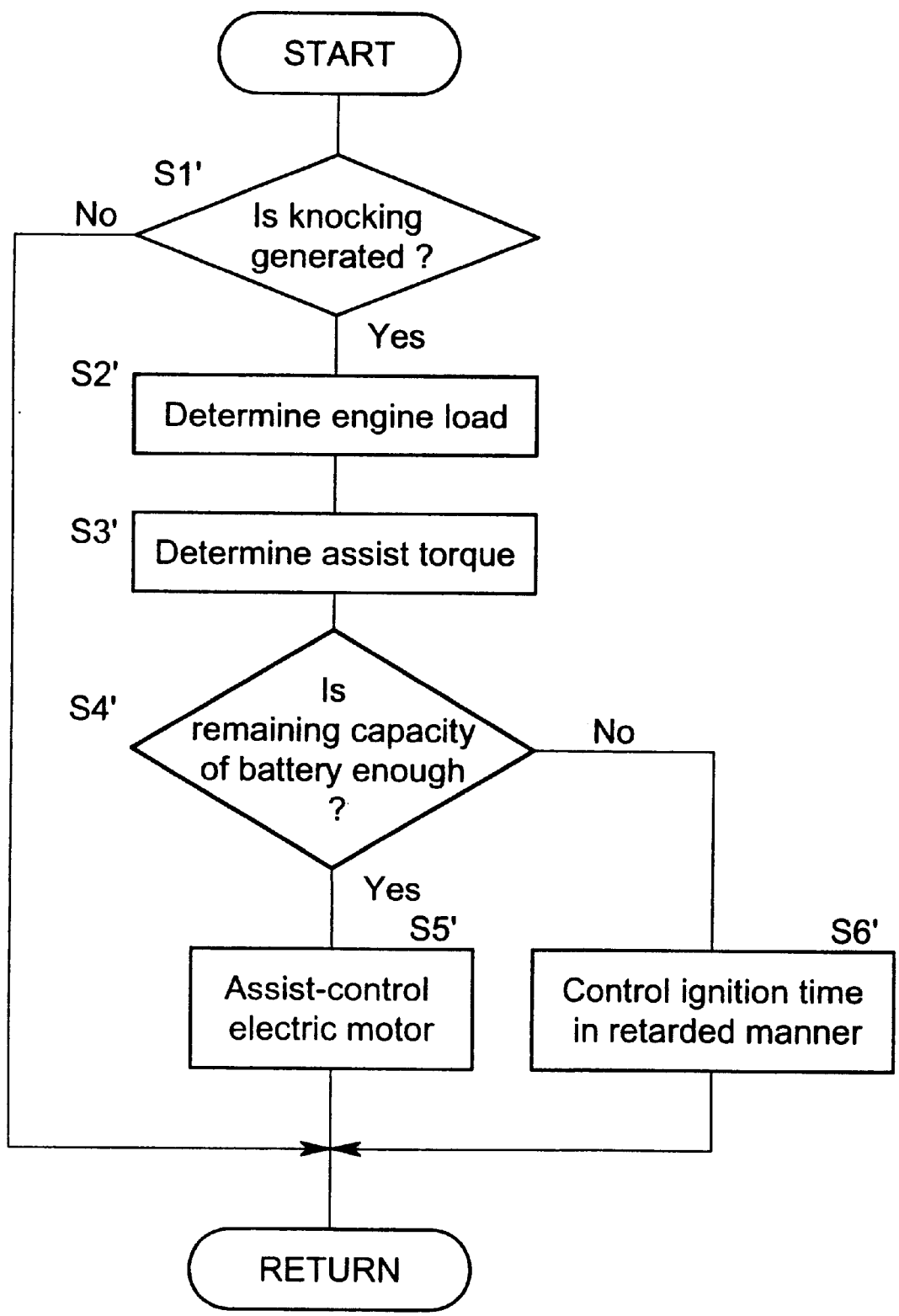
FIG. 4 is a flowchart similar to FIG. 2, but according to a second embodiment of the present invention.
Figure 5:
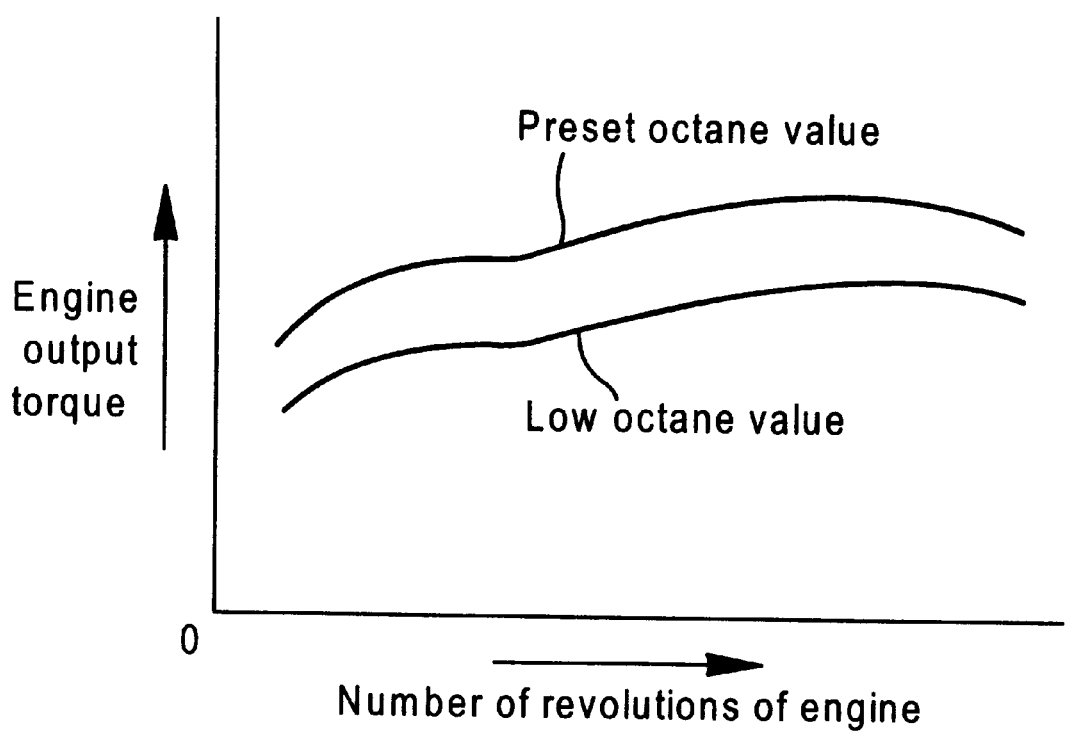
FIG. 5 is a diagram showing the assist forces when the gasoline has a preset octane value and when the gasoline has a low octane value.

FIG. 4 illustrates a second embodiment of the present invention. At step S1', it is determined whether a knocking has been detected by the knock sensor 6. If the knocking has been detected, the processing is advanced to step S2' at which the load of the gasoline engine 1 at the time of generation of the knocking is determined on a map based on the number of revolutions of the engine and the negative pressure in the air intake pipe, as detected by an intake air pressure sensor 10. Then, at step S3', an assist torque is determined on a map based on the engine load and the number of revolutions of the engine. At step S4', it is determined whether the remaining capacity of the electric motor-assisting battery 8 is enough to drive the electric motor 2. If the remaining capacity is enough, the assist control of the electric motor 2 is carried out at step S5'. If the remaining capacity is not enough, a control signal from the ignitor control means 5 is supplied to the ignitor 4 to vary the ignition timing of the gasoline engine 1 to be retarded.

Even in this embodiment, when a driver unconsciously uses a gasoline of an octane value lower than the preset octane value, the degradation in drivability will not be generated that the driver will be conscious of. Moreover, the protection of the gasoline engine 1 by accommodating the knocking can be performed, because the ignition timing of the gasoline engine 1 is variably retarded, even when the remaining capacity of the electric motor-assisting battery 8 is not enough to provide assist power.

Although the embodiments of the present invention have been described in detail, it will be understood that the present invention is not limited to the above-described embodiments. And various modifications may be made without departing from the subject matter and scope of the invention defined in the claims.

For example, the electric motor 2 may be connected to the transmission 3 in parallel to the gasoline engine 1 or may be mechanically connected to the gasoline engine 1.

What is claimed is:

1. A hybrid vehicle comprising;
   a gasoline engine;
   an electric motor connected to said gasoline engine for providing a driving assist force to said gasoline engine;
   a transmission continuosly connected between driving wheels of the vehicle and the connected electric motor and gasoline engine, said gasoline being operated continuously during moving operation of the vehicle for powering said driving wheels in all speed and power rangers;
   a knock sensor mounted on said gasoline engine; and
   an electric motor control means for controlling said electric motor so as to automatically apply an assist force to said gasoline engine in direct response to detection of a knocking by said knock sensor.

2. A hybrid vehicle according to claim 1, wherein the ignition timing of the gasoline engine by an ignitor is retarded in response to the detection of a knocking by said knock sensor.

3. A hybrid vehicle according to claim 2, wherein an increment of the applied assist force by the electric motor by the control of said electric motor control means is determined in accordance with an amount by which the ignition timing is retarded by an ignitor control means.

4. A hybrid vehicle according to claim 1, wherein an increment of the applied assist force by the electric motor by the control of said electric motor control means is determined by a change in the load on the gasoline engine.

5. A hybrid vehicle according to claim 4, wherein said change in the load on the gasoline engine is determined from a detected number of revolutions of the gasoline engine and a detected intake air pressure of the gasoline engine.

6. A hybrid vehicle according to claim 1, further including means for determining a capacity of a battery for supplying electricity to said electric motor, and said electric motor control means being responsive to said battery capacity determining means for preventing the application of the assist force by said electric motor when the battery capacity is below a predetermined amount.

7. A hybrid vehicle having a transmission connected to driving wheels comprising;
   a gasoline engine for continuously supplying a driving force for the vehicle during moving operation of the vehicle in all speed and power ranges;
   an electric motor connected to said gasoline engine for producing a driving assist force to said gasoline engine, the connected electric motor and gasoline engine also being connected to the transmission;
   means for reducing the driving force supplied by the gasoline engine in response to a detected operating condition of said gasoline engine; and
   an electric motor control means for controlling said electric motor so as to automatically apply an assist force to said gasoline engine by said electric motor in direct response to said reduction in driving force supplied by said gasoline engine.

8. A hybrid vehicle according to claim 7, wherein the ignition timing of the gasoline engine by an ignitor is retarded to cause the reduction in driving force supplied by said gasoline engine.

9. A hybrid vehicle according to claim 7, wherein said means for reducing the driving force by the gasoline engine includes a knock sensor mounted on said gasoline engine and an ignition control means for retarding the ignition timing of said gasoline engine when knocking is sensed by said knock sensor.

10. A hybrid vehicle according to claim 7, wherein an increment of the applied assist force by the electric motor by the control of said electric motor control means is determined by a change in the load on the gasoline engine.

11. A hybrid vehicle according to claim 10, wherein said change in the load on the gasoline engine is determined from a detected number of revolutions of the gasoline engine and a detected intake air pressure of the gasoline engine.

12. A hybrid vehicle according to claim 7, further including means for determining a capacity of a battery for supplying electricity to said electric motor, and said electric motor control means being responsive to said battery capacity determining means for preventing the application of the assist force by said electric motor when the battery capacity is below a predetermined amount.

13. A hybrid vehicle having a transmission connected to driving wheels comprising;
   a gasoline engine for continuously supplying a driving force for the vehicle during moving operation of the vehicle in all speed and power ranges;
   an electric motor directly connected to said gasoline engine for selectively producing a driving assist force to said gasoline engine, the connected electric motor and gasoline engine also being connected to the transmission;
   means for reducing the driving force supplied by the gasoline engine in response to a detected operating condition of said gasoline engine; and
   an electric motor control means for controlling said electric motor so as to automatically apply an assist force to said gasoline engine by said electric motor in direct response to said reduction in driving force supplied by said gasoline engine, said electric motor control means controlling said electric motor assist force to be substantially equal to said reduction in the gasoline engine driving force that occurs in response to said detected operating condition for thereby maintaining a substantially level driving force for the vehicle.

14. A hybrid vehicle according to claim 13, wherein the ignition timing of the gasoline engine by an igniter is retarded to cause the reduction in driving force supplied by said gasoline engine.

15. A hybrid vehicle according to claim 13, wherein said means for reducing the driving force by the gasoline engine includes a knock sensor mounted on said gasoline engine and an ignition control means for retarding the ignition timing of said gasoline engine when knocking is sensed by said knock sensor.

16. A hybrid vehicle according to claim 13, wherein an increment of the applied assist force by the electric motor by the control of said electric motor control means is determined by a change in the load on the gasoline engine.

17. A hybrid vehicle according to claim 16, wherein said change in the load on the gasoline engine is determined from a detected number of revolutions o the gasoline engine and a detected intake air pressure of the gasoline engine.

18. A hybrid vehicle according to claim 13, further including means for determining a capacity of a battery for supplying electricity to said electric motor, and said electric motor control means being responsive to said battery capacity determining means for preventing the application of the assist force by said electric motor when the battery capacity is below a predetermined amount.

* * * * *